United States Patent [19]
Baxter et al.

[11] Patent Number: 5,522,777
[45] Date of Patent: Jun. 4, 1996

[54] ELECTRONIC TRANSFER CASE SHIFTING APPARATUS

[75] Inventors: Ralph W. Baxter, Ft. Wayne; Randy L. Sommer, Monroeville, both of Ind.

[73] Assignee: Dana Corporation, Toledo, Ohio

[21] Appl. No.: 238,440

[22] Filed: May 5, 1994

[51] Int. Cl.⁶ .......................... B60K 17/354; B60K 41/04
[52] U.S. Cl. .............. 477/36; 477/109; 180/247
[58] Field of Search .................... 364/424.1; 180/247; 477/109, 107, 35, 77, 78, 79, 35, 36

[56] References Cited

U.S. PATENT DOCUMENTS

| | | | |
|---|---|---|---|
| 3,149,505 | 9/1964 | Burkhalter et al. | 475/204 X |
| 3,605,523 | 9/1971 | O'Brien | 475/204 X |
| 3,955,442 | 5/1976 | Kessmar | 74/665 GE |
| 4,526,063 | 7/1985 | Oster | 475/205 X |
| 4,622,859 | 11/1986 | Hobson | 74/15.88 |
| 4,671,373 | 6/1987 | Sigl | 477/35 X |
| 4,679,450 | 7/1987 | Hayakawa et al. | 477/36 |
| 4,722,248 | 2/1988 | Braun | 477/121 |
| 4,843,914 | 7/1989 | Koike | 477/109 |
| 4,850,236 | 7/1989 | Braun | 74/337 |
| 4,860,612 | 8/1989 | Dick et al. | 74/665 H |
| 4,866,624 | 9/1989 | Nishikawa et al. | 364/426.03 |
| 4,912,639 | 3/1990 | Kawamoto et al. | 364/424.1 |
| 4,937,750 | 6/1990 | Gilliam | 364/424.1 |
| 4,982,809 | 1/1991 | Nakamura et al. | 364/424.1 X |
| 5,035,158 | 7/1991 | Leigh-Monstevens | 721/335 X |
| 5,105,902 | 4/1992 | Wilson et al. | 180/247 |
| 5,117,791 | 6/1992 | Chan et al. | 123/333 |
| 5,150,637 | 9/1992 | Ninomiya et al. | 74/335 |
| 5,305,213 | 4/1994 | Boardman et al. | 477/109 X |
| 5,330,030 | 7/1994 | Eastman et al. | 180/247 X |
| 5,363,938 | 11/1994 | Wilson et al. | 180/247 X |

FOREIGN PATENT DOCUMENTS 56-89083   12/1982   Japan.

*Primary Examiner*—Khoi Q. Ta
*Attorney, Agent, or Firm*—Oldham & Oldham Co.

[57] ABSTRACT

The invention is directed to a four-wheel drive system for a vehicle having front and rear drive wheels driven by an engine and transmission assembly, and including a transfer case having a torque input shaft for receiving output torque from the vehicle engine and transmission assembly. A transfer gear assembly of the transfer case provides low and high speed power paths, and a shift mechanism is provided to shift between the low and high speed power paths. The system further includes an engine control module for controlling the engine fuel system and shifting of the transmission assembly between a plurality of vehicle gear ratios. A transfer case control module controls the shift mechanism for shifting between the low and high speed power paths. The transfer case control module is connected to the engine control module, and controls shifting between the low and high speed power paths by selectively controlling the engine fuel system to modify torque supplied to the transfer case, and/or shifting of the transmission assembly. The transfer case control module will thereafter shift the transfer case to a selected high or low speed power path when the output speed of the transmission assembly matches the output speed of the transfer case. The system allows the transfer case to be shifted from low range to high range or vice versa on-the-fly, while the vehicle is still moving and under power. The invention also provides a method of shifting a four-wheel drive system between low range and high range drive modes on-the-fly.

15 Claims, 2 Drawing Sheets

ELECTRONIC TRANSFER CASE SHIFTING APPARATUS

BACKGROUND OF THE INVENTION

The invention is in general directed to an electronic transfer case shifting apparatus which allows shifting between low and high range drive modes provided by the transfer case on-the-fly while the vehicle is moving and under power.

Four-wheel drive systems for vehicles are becoming increasingly popular in a variety of types of vehicles. Four-wheel drive vehicles have typically included a transfer case connected to the output of a vehicle transmission, with manual control means operable in the vehicle passenger cab, enabling shifting between two- and four-wheel drive modes as well as low and high range drive modes. More recently, certain full-time four-wheel drive systems have been employed, wherein a transfer case is provided with an interaxle differential for dividing torque between the vehicle front and rear differentials. Control systems for operating such a transfer case have been developed, and may be used to prevent excessive slipping between front and rear wheels by selectively locking the interaxle differential upon sensing such slippage.

In part-time four-wheel drive vehicles, it is known to use a gear synchronizer clutching arrangement to provide "shift-on-the-fly" shifting between two- and four-wheel drive modes. Such a synchronizer will shift the transfer case into two-wheel or four-wheel drive modes upon synchronization of the speeds of front and rear axles of the vehicle. In four-wheel drive vehicles, the torque transfer case may also provide high and low range drive modes during four-wheel drive operation. Generally, shifting between high and low ranges requires that the vehicle be stopped and that the vehicle transmission be placed into a neutral position, while the brake is applied to insure that the respective vehicle wheels and axles are not rotating. Attempts have been made to install mechanical synchronizers to allow shifting between high and low ranges, but the additional hardware increases costs and complexity of the transfer case.

SUMMARY OF THE INVENTION

It is an object of the invention to provide an electronic transfer case which is automatically controlled to be shifted from low range to high range on-the-fly, without it being necessary to stop the vehicle.

The invention generally provides a four-wheel drive system for a vehicle having front and rear drive wheels driven by an engine and transmission assembly providing output torque to a torque transfer case which divides torque between front and rear wheels. The system comprises a transfer case including a torque input shaft for receiving output torque from the vehicle engine and transmission assembly, and front and rear output shafts with means to drivingly connect the input shaft to the front and rear output shafts. The means to drivingly connect the input shaft to the output shafts includes at least low and high speed power paths, with electric shift means to shift between the low and high speed power paths. The system further includes an engine control module for controlling the engine fuel system and shifting of the transmission assembly between a plurality of vehicle gear ratios. A transfer case control module controls the shift means for shifting between at least the low and high speed power paths, with the transfer case control module having as inputs thereto at least signals corresponding to the vehicle gear ratio, the engine speed, the vehicle speed, and the selected transfer case power path. The transfer case control module is connected to the engine control module and controls shifting between the low and high speed power paths by selectively controlling the engine fuel system to torque supplied to the torque input shaft and/or shifting of the transmission assembly. The transfer case control module will thereafter shift the transfer case out of the high or low speed power path, and affect shifting into the other of said high or low speed power paths when the output speed of the transmission assembly matches the input speed of the transfer case. The system allows the transfer case to be shifted from low range to high range or vice versa without stopping the vehicle, but rather while the vehicle is still moving and under power. The transfer case control module allows on-the-fly shifting between the low and range drive modes without additional mechanical components in the transfer case. The invention also provides a method of shifting a four-wheel drive system between low range and high range drive modes on-the-fly.

BRIEF DESCRIPTION OF THE DRAWINGS

The foregoing and other objects, features and advantages of the invention will be more clearly understood upon reading of the detailed description of the preferred embodiment, with reference to the drawings, wherein.

DETAILED DESCRIPTION OF THE INVENTION

Figure 1:
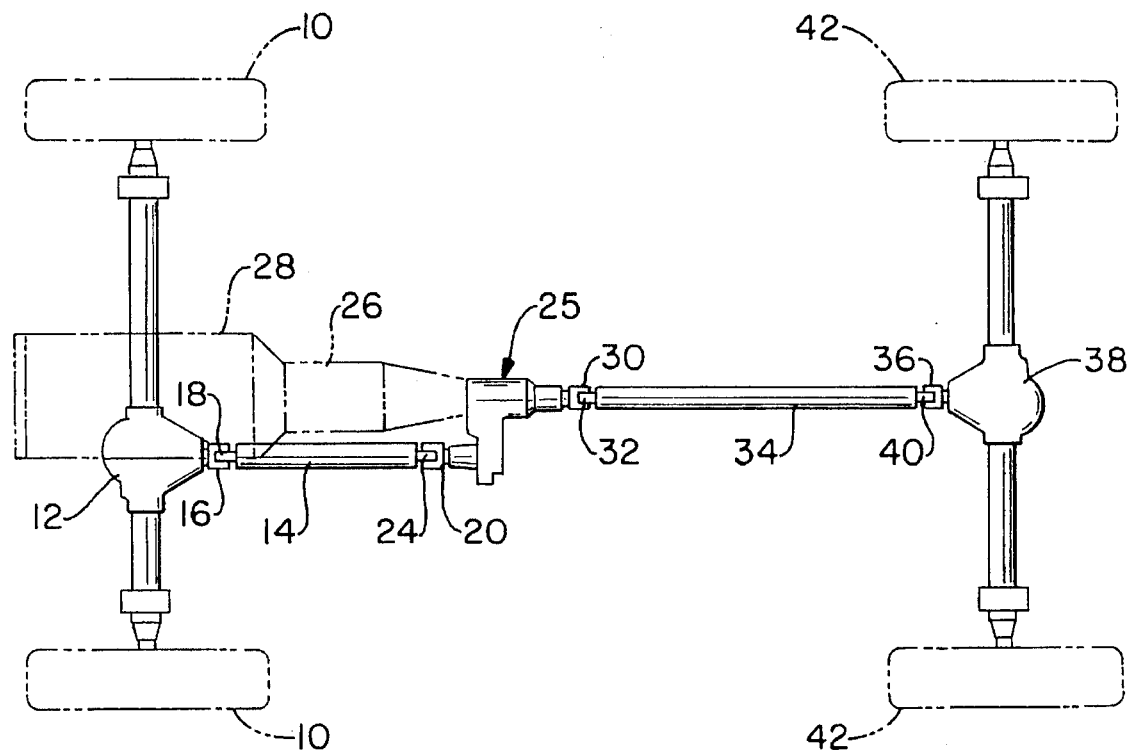
FIG. 1 is a top plan view of a four-wheel drive system in accordance with the invention.

Turning now to FIG. 1, a vehicle four-wheel drive system is shown to include front drive wheels 10 coupled to a front differential 12 adapted to divide torque from a front drive shaft 14 to each of the front wheels 10. The front output shaft 14 is coupled to the front differential 12 by means of an input shaft or yoke 16 through a conventional universal joint coupling 18. The rearward end of the front drive shaft 14 is coupled to a front output shaft or yoke 20 of a torque transfer case 25 by means of a universal joint coupling 24. The transfer case 25 is secured to the rear of a transmission unit 26 which in turn is coupled to a drive engine 28. As will be discussed hereinafter, the transmission unit 26 is provided with an output shaft which is coupled to a torque input shaft of the transfer case 25, to transfer torque from the vehicle engine and transmission assembly to the transfer case 25. The transfer case 25 divides torque from the vehicle engine and transmission assembly to the front drive wheels 10 by means of the front output shaft 20 as described. Similarly, a rear output shaft or yoke 30 of the transfer case 22 is coupled by means of a universal joint coupling 32 to a rear drive shaft 34, which in turn is coupled to an input shaft or yoke 36 of a rear differential 38 by means of a universal joint coupling 40. Torque from the vehicle engine and transmission assembly is supplied to the rear output shaft 30 of the transfer case 25 and through rear drive shaft 18 to the rear differential 38 which divides the torque to rear wheels 42.

Figure 2:
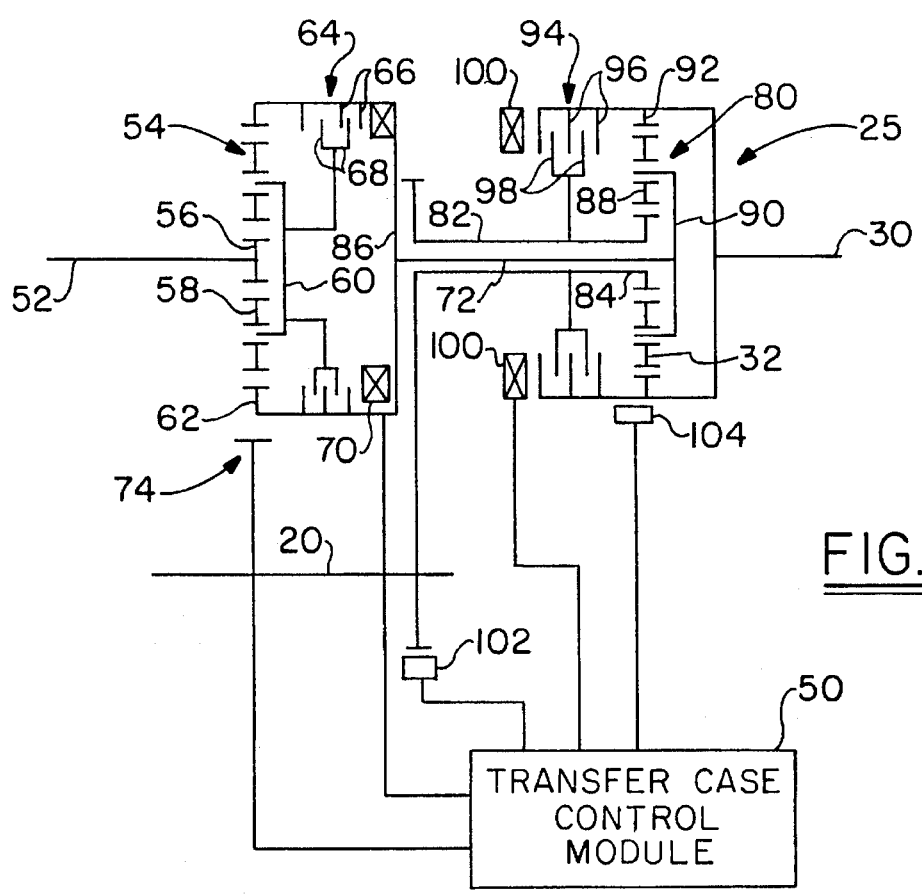
FIG. 2 is a schematic illustration of the internal components of the vehicle transfer case in accordance with the invention.

The transfer case 25 of the four-wheel drive systems is shown schematically in FIG. 2, including an electronic control module for controlling operation of the transfer case 25. The transfer case 25 includes an input shaft 52 coupled to the output shaft of the vehicle transmission assembly 26 (shown in FIG. 1). The transfer case 25 also includes a front output shaft 20 and a rear output shaft 30, each of which are connected to respective front and rear drive shafts 32 and 34, respectively, as shown in FIG. 1. The transfer case utilizes a transfer gear assembly generally indicated at 54, which in the preferred embodiment comprises a planetary gear set. The transfer gear assembly 54 includes a sun gear 56 mounted for rotation with input shaft 52, and a plurality of planetary pinion gears 58 mounted within a planetary carrier 60. The planetary gears 58 couple rotation of the sun gear 56 through to a ring gear 62 of the planetary gear set in a predetermined gear ratio. A multi-disk clutch assembly 64, such as an electromagnetic clutch, includes a first group of clutch plates 66 which are secured for rotation with the ring gear 62, and a second group of clutch plates 68 secured to the planetary carrier 60. An annular clutch coil 70 is positioned adjacent to the clutch plates 66 and 68 and is adapted to receive a clutch engagement signal from the transfer case control module 50. Upon receiving a clutch engagement signal, the clutch assembly 64 is actuated to urge clutch plates 66 and 68 into frictional engagement with one another to prevent relative rotation therebetween. In this manner, the planetary carrier 60 is locked to the ring gear 62 for direct connection and rotation therewith. Upon actuation of the clutch assembly 64, a predetermined gear ratio is supplied through the gear set to an intermediate shaft 72. Alternatively, with clutch assembly 64 deactivated, the ring gear 62 will rotate at a predetermined ratio relative to the input shaft 52, and being coupled to the intermediate shaft 72, will rotate the intermediate shaft at predetermined speed. Associated with the transfer gear assembly 54 is a shift means 74 which may comprise a clutch means adapted to engage and ground the ring gear 62 of the transfer gear assembly 54. Alternatively, the shift means 74 may comprise a brake means such as band brake and an actuating member such as a piston which is moveable into and out of engagement with the brake means. The shift means 74 is selectively actuated by means of the transfer case control module 50 to ground the ring gear 62 of the transfer gear assembly 54. Actuation of the shift means 74 shifts the transfer case into a low speed drive range, while deactivation provides a high speed drive range. The shift means 74 selectively transmits driving power to intermediate shaft 72 with or without torque multiplication. Operation of the shift means 74 via the transfer case control module 50 allows smooth shifting "on-the-fly" upon a determination that shifting between low and high speed drive ranges is acceptable for the driving conditions of the vehicle as will be hereinafter described.

The transfer case 25 further includes an interaxle planetary gear differential generally indicated at 80, for dividing torque between the rear output shaft 30 and the front output shaft 20. In particular, the intermediate shaft 72 may have a sleeve member 82 mounted for rotation with the intermediate shaft 72, the sleeve member 82 carrying a sun gear 84 of the planetary gear differential 80. The sleeve member 82 may also carry a drive means 86, such as an output gear or a chain drive, which in turn is coupled through to the front output shaft 20 to provide driving power thereto. The planetary gear differential 80 further includes a plurality of circumferentially spaced and individually rotatable planet gears carried within a planet carrier 90 secured for rotation with intermediate shaft 72. The planet carrier 90 is coupled to a ring gear 92, which in turn is coupled to rotatably drive the rear output shaft 30 with a ratio determined by the planet gears of the interaxle planetary gear differential 80. The interaxle planetary gear differential 80 further may include an electromagnetic clutch assembly generally indicated at 94, including a plurality of clutch plates 96 secured for rotation with the ring gear 92 and a plurality of clutch plates 98 secured for rotation with the sleeve member 82 for rotation with the sun gear 84. An annular clutch coil 100 is coupled to the transfer case control module 50 to receive a clutch engagement signal for activating clutch 94. Upon actuation of clutch 94, the clutch plates 96 and 98 are urged together to lock the sun gear 84 with the ring gear 92. Locking of the sun gear 84 to the ring gear 92 will prevent any relative slip between the front and rear output shafts 20 and 30 respectively.

The planetary gear differential 94 is provided for dividing torque between the rear output shaft 30 and the front output shaft 20 as previously mentioned. Normally, the electromagnetic clutch 94 is not energized, allowing a predetermined slippage between the front and rear output shafts to accommodate slightly different front and rear wheel speeds which occur during normal driving conditions, such as when the vehicle is turning. However, upon slippage between the front and rear wheels of the vehicle which exceeds a predetermined amount, the transfer case control module 50 will actuate clutch assembly 94 to cause the planetary gear differential to lock and provide direct drive connection between the intermediate shaft 72 and the front and rear output shafts 20 and 30 respectively. More particularly, when the ring gear 92 is locked relative to the sun gear 84, the planet gears 88 will be prevented from rotating to thereby prevent rotation of the planet carrier 90 relative to either the ring gear 92 or sun gear 84, providing a differential locked drive mode. Actuation of the clutch assembly 94 occurs upon sensing a predetermined difference of speed between the front and rear output shafts 20 and 30, which may be sensed by suitable speed sensors 102 and 104 for the front and rear output shafts respectively. Each of the speed sensors are coupled to the transfer case control module 50, which will develop clutch actuation signals upon the occurrence of a predetermined amount of slippage between the output shafts.

It should be noted that the transfer case illustrated in FIG. 2 is only one example of a transfer case which can be electronically controlled to shift between high speed and low speed ranges on-the-fly, and that other transfer cases having low and high speed power paths are contemplated within the invention.

Figure 3:
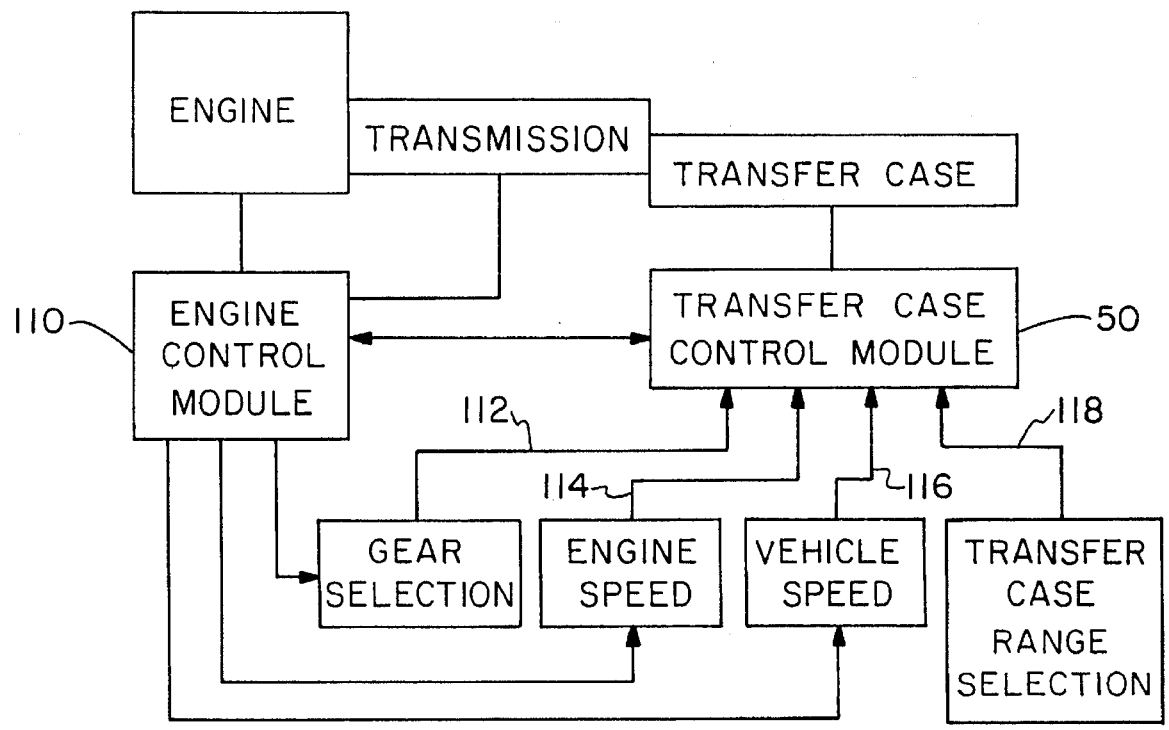
FIG. 3 shows a schematic block diagram illustration of the electronic control system for the four-wheel drive system of the invention.

The electronic transfer case shifting apparatus of the invention allows shifting between low and high range drive modes provided by the transfer case 25 on-the-fly, while the vehicle is moving and under power. The transfer case control module 50 as shown in FIG. 2 must therefore control operation of the shift means 74 (shown in FIG. 2) to shift the transfer case from low range to high range or high range to low range while the vehicle is moving. The transfer case control module 50 is coupled to a drive mode selection means (not shown) provided in the driver's cab of the vehicle, to allow the driver to select high or low range dependent upon the driving conditions encountered. The transfer case control module 50 provides computer control of the electric shift transfer case 25, and enables shifting of the transfer case from low range to high range or vice versa on-the-fly in the following manner. As shown in FIG. 3, the transfer case control module itself is coupled to a engine control module 110 used to monitor and control the vehicle engine and transmission assembly. For shifting between low and high range drive modes on-the-fly, the transfer case control module 50 receives as inputs thereto the gear selection in which the vehicle transmission is presently operating on line 112, along with the engine speed on input line 114, the vehicle speed on line 116, along with the transfer case range selection on input line 118. The input signals relating to gear selection, engine speed, and vehicle speed may be generated by the engine control module 110, while the transfer case range selection is supplied to the transfer case control module 50 from the drive mode selection means. The transfer case control module 50 includes processing which will determine whether the present vehicle operation would allow shifting from low range to high range or high range to low range safely and without over revving the vehicle engine.

The transfer case control module 50 uses the input control signals to determine whether operation of the vehicle coincides with the ability to properly shift from high range to low range or vice versa, and if so will control signal to the shift means 74 (shown in FIG. 2) to affect the desired shifting. Alternatively, if present vehicle operation is not compatible with shifting from high range to low range or vice versa, the transfer case control module 50 will generate output signals which are supplied to the engine control module 110, which in turn will modify vehicle operation to allow shifting from high to low or low to high range as desired.

Figure 4:
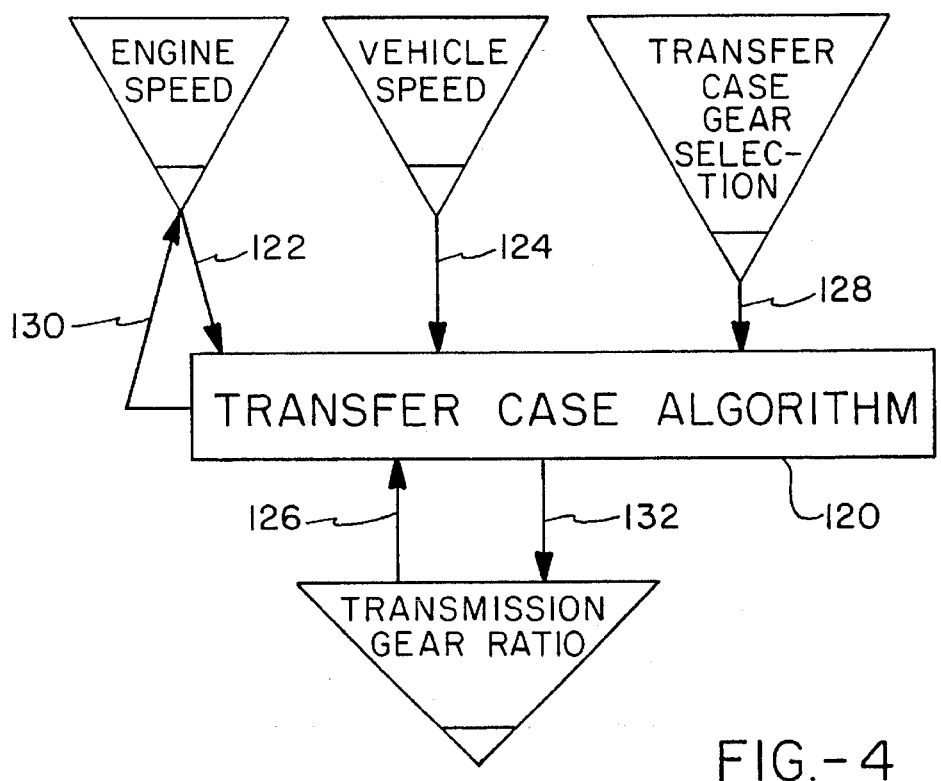
FIG. 4 shows a flow diagram for the transfer case control module to affect shifting between low speed range and high speed range drive modes.

As shown in FIG. 4, the transfer case control module 50 performs processing of the input signals as described, and generates appropriate output signals via a transfer case algorithm generally designated 120. The transfer case algorithm 120 is provided with the inputs relating to engine speed on line 122, vehicle speed on line 124, and the transmission gear ratio on line 126 from the engine control module 110 as previously described. The transfer case gear selection is input on line 128, and the transfer case algorithm 120 will then generate output signals to modify engine speed on line 130, or to shift the transmission gear ratio on line 132. The transfer case control module 50, when given the signal to shift between high or low speed ranges, will then determine whether present operation would allow the selected shifting between high and low speed power paths. If vehicle operation is not compatible with the selected drive range, the transfer case control module will control the engine fuel system via the engine control module 110 to therefore reduce the torque supplied to the input shaft 52 (shown in FIG. 2) of transfer case 25. Alternatively, or in conjunction with controlling the fuel system the transfer case algorithm 120 will generate an output signal on line 132 to shift the transmission gear ratio so as to match the transmission output speed to the transfer case output speed. Input signals to the transfer case algorithm 120 are continuously updated to generate appropriate output signals on lines 130 and 132 until vehicle operation has been modified to the point where shifting between high and low speed ranges can be accomplished safely and smoothly. Proper shifting between high and low range or vice versa can occur when the engine speed and/or the transmission gear position is reduced to match the transmission output speed to the transfer case output speed, wherein shifting of the transfer case can be performed safely and without over revving the vehicle engine.

For example, the invention will provide shifting on-the-fly between low range to high range drive modes in the following manner. With the transfer case in low range, and the vehicle transmission in third or fourth gear, the high range shift button of a drive mode selection means (not shown) provided in the driver's cab of the vehicle is activated. The transfer case control algorithm 120 will then shift the transfer case 25 into a neutral position. The vehicle transmission is then shifted down two gears, for example, from fourth to second or third to first, depending upon the present transmission gear position. If the vehicle speed hasn't decreased, and the engine speed has been maintained, the transmission output speed and the transfer case output speed will now be the same and the transfer case can be shifted into high range. The vehicle can then be accelerated in the normal manner. If the vehicle has slowed while the transfer case is in the neutral position, the engine speed will also have to be decreased to match the transmission output speed to the transfer case output speed. Shifting from low range to high range on-the-fly would be useful if the vehicle was pulling a heavy load from an off-highway condition on to the roadway, allowing shifting from low range to high range without stopping the vehicle to perform shifting.

Similarly, it may be desired to shift the transfer case from high range to low range, for example where a load is being pulled from a roadway to off-road conditions. In this situation, the transfer case 25 would be in the high range, and the vehicle transmission in first or second gear. The vehicle operator would then select low range, and the transfer case control algorithm 120 would determine if the transmission output speed matched the transfer case output speed. If so, shifting from high range to low range could be accomplished. If not, the transfer case control algorithm 120 would shift the transfer case into neutral and via the engine control module would shift the vehicle transmission up two gears. If the vehicle speed hasn't decreased, the transmission output speed will now match the transfer case output speed, and the transfer case can safely be shifted from neutral into low range. If the vehicle has slowed, the engine speed would be decreased until the transmission output speed matches the transfer case output speed, at which point shifting can be performed safely.

Based upon the foregoing, the transfer case control module will affect shifting of the transfer case from low to high range or high to low range by modifying vehicle operation in an appropriate manner via an engine control module. Vehicle operation can be modified by interrupting the engine fuel system to reduce torque to the transfer case, or increasing the engine speed depending on whether shifting is desired from high to low range or low to high range respectively. Along with modifying the engine speed, the transfer case control module may vary the transmission gear position either separately or in conjunction with modifying the engine speed as described. Controlling vehicle operation in this manner will allow matching of the transmission output speed to the transfer case output speed, at which point shifting between high and low speed ranges can be performed properly.

In the invention, the transfer case algorithm 120 will monitor vehicle operation in the manner described to shift the transfer case between low speed and high speed ranges on-the-fly, which requires that the transmission output speed being matched to the transfer case output speed. Due to safety issues of the driver losing control of the vehicle, or over revving of the vehicle engine, the vehicle speed range at which shifting between high and low speed ranges can be performed properly is somewhat small. For example, for a vehicle having an axle ratio of 2.73:1, a tire static loaded radius of 14.7" for LT215/85R 16 type tires, and transmission gear ratios of 2.40, 1.46, 1.0, and 0.667, may be shifted to high or low speed ranges according to the following parameters. In this example, the torque transfer case start ratio is 2.28:1, and the transfer case high speed to low speed ratios are 1:1 and 2.64:1. For a vehicle with these characteristics, the transfer case algorithm 120 will perform shifting between high and low speed ranges according to the following table as an example.

| Transmission Gear Ratio | Engine Speed (RPM) | Vehicle Speed (MPH) Transfer Case High | Vehicle Speed (MPH) Transfer Case Low |
| --- | --- | --- | --- |
| 1st gear | 600 | 4.8–8.0 | 1.8–3.0 |
| 1st gear | 5000 | 40.7–66.7 | 15.0–25.0 |
| 2nd gear | 600 | 8.0–13.0 | 3.0–5.0 |
| 2nd gear | 5000 | 66.0–110.0 | 25.0–42.0 |
| 3rd gear | 600 | 11.7–19.2 | 4.4–7.0 |
| 3rd gear | 5000 | 97.7–160.0 | 37.0–60.7 |
| 4th gear | 600 | 17.6–28.8 | 6.6–10.8 |
| 4th gear | 5000 | 147.0–240.0 | 55.5–91.0 |

Similar parameters can be readily obtained by those skilled in the art for different particular vehicle configurations, which will translate into an appropriate transfer case algorithm for that vehicle.

Although a preferred embodiment of the invention has been illustrated and described in detail, it will be apparent that various changes or modifications may be made without departing from the spirit of the invention, the scope of which is only to be limited by the appended claims.

What is claimed is:

1. A four-wheel drive system for a vehicle having front and rear drive wheels driven by an engine including a fuel system and operating at different engine speeds, and a transmission assembly with a plurality of transmission gear ratios providing output torque to a transfer case, said system comprising:

a transfer case including a torque input shaft for receiving output torque from the vehicle engine and transmission assembly, transfer case output including a front output shaft and a rear output shaft with means to operatively connect said input shaft to said front and rear output shafts, said means to operatively connect said input shaft to said output shafts including at least low and high speed power paths with shift means to shift between said low and high speed power paths, an engine control module for at least controlling the engine fuel system and shifting of said transmission assembly between the plurality of gear ratios, a transfer case control module including means to determine the output speed of said transmission assembly and the speed of said transfer case output for controlling said shift means for shifting between said low and high speed power paths, said transfer case control module having as inputs thereto at least signals corresponding to the transmission gear ratio, the engine speed, the speed of said vehicle and the transfer case power path selected, wherein said transfer case control module is connected to said engine control module and controls shifting between said low and high speed power paths by selectively controlling one of the engine fuel system to modify torque supplied to said torque input shaft and, by selectively shifting said transmission assembly between said plurality of gear ratios, and shifting said transfer case between said high and low speed power paths.

2. The four-wheel drive system of claim 1, wherein, said transfer case further includes a transfer gear assembly which provides selective torque multiplication of torque provided to said torque input shaft, with said shift means selectively actuated to shift said transfer gear assembly between said low speed and high speed power paths.

3. The four-wheel drive system of claim 2, wherein, said transfer gear assembly comprises a planetary gear set including a sun gear mounted for rotation with said torque input shaft, a plurality of planetary pinion gears mounted within a planetary carrier and a ring gear, with said pinion gears coupling rotation of said sun gear through to said ring gear, and clutch means selectively actuated to ground said planetary carrier to said ring gear for direct connection and rotation therewith to transfer torque to an intermediate shaft for rotation of said intermediate shaft at a predetermined speed, with said shift means selectively actuated to ground said ring gear and drive said intermediate shaft with torque multiplication in a low speed power path.

4. The four-wheel drive system of claim 3, wherein, said shift means comprises a clutch means adapted to engage and ground said ring gear of said transfer gear assembly.

5. The four-wheel drive system of claim 3, wherein, said shift means comprises a brake means selectively actuated to ground said ring gear of said transfer gear assembly.

6. The four-wheel drive system of claim 1, wherein, said means to drivingly connect said input shaft to said front and rear output shafts includes an interaxle planetary gear differential for dividing torque between said front and rear output shafts.

7. The four-wheel drive system of claim 6, wherein, said interaxle planetary gear differential includes a sun gear drivingly connected to said torque input shaft, and a plurality of circumferentially spaced and individually rotatable planet gears carried within a planet carrier, said planet carrier coupled to a ring gear which in turn is coupled to rotatably drive said rear output shaft and clutch means selectively actuated to lock said sun gear to said ring gear of said interaxle planetary gear differential, wherein locking of said sun gear to said ring gear will prevent any relative slip between said front and rear output shafts.

8. The four-wheel drive system of claim 7, wherein, said clutch means associated with said interaxle planetary gear differential is actuated upon sensing a predetermined difference of speed between said front and rear output shafts, wherein a clutch actuation signal is generated by said transfer case control module.

9. The four-wheel drive system of claim 1, wherein, said engine control module monitors operation of the vehicle, and generates signals corresponding to said inputs to said transfer case control module.

10. The four-wheel drive system of claim 1, wherein, said transfer case control module includes processing means which determines if present vehicle operation is compatible with shifting between said high speed power path and said low speed power path, wherein if it is determined that vehicle operation is not compatible with a desired shift between said low and high speed power paths, said transfer case control module will generate control signals supplied to said engine control module to control either the engine fuel system or shifting of said transmission assembly until vehicle operation is determined to be compatible with the desired shift between said low and high speed power paths.

11. A method of shifting between low and high speed power paths provided by a transfer case in a four-wheel drive vehicle having an engine including a fuel system and operating at different engine speeds, and a transmission assembly having a plurality of gear ratios with the transmission assembly supplying torque to the transfer case, comprising the steps of:

provided an engine control module for monitoring and controlling operation of said vehicle, said engine control module generating output signals corresponding to the vehicle transmission gear ratio, the engine speed and the vehicle speed, supplying said output signals from said engine control module to a transfer case control module along with signal corresponding to selected transfer case power path, determining in said transfer case control module whether operation of said vehicle is compatible with shifting between the present one of low and high speed power paths to said selected transfer case power path, and generating control signals from said transfer case control module to shift to said selected transfer case power path when said present vehicle operation is compatible with shifting between said present power path and said selected power path, otherwise supplying control signals from said transfer case control module to said engine control module to modify operation of said vehicle until vehicle operation is compatible with said shifting between the present one of low or high speed power paths to said selected transfer case power path and then effect shifting to said selected transfer case power path.

12. The method of claim 11, wherein, said step of modifying operation of said vehicle by means of said engine control module includes controlling the engine fuel system to modify torque supply to said transfer case.

13. The method of claim 11, wherein, said step of modifying operation of said vehicle via said engine control module includes modifying the transmission gear ratio of said transmission assembly.

14. The method of claim 11, wherein, said step of modifying operation of said vehicle via said engine control module includes controlling the engine fuel system to modify torque supplied to said transfer case in conjunction with modifying the transmission gear ratio of said transmission assembly.

15. The method of claim 11, further comprising the steps of:

determining the output speed of said transmission assembly and the output speed of said transfer case, wherein said shifting to said selected transfer case power path is performed when the output speed of said transmission assembly substantially matches the output speed of said transfer case.

* * * * *